US011803224B2

(12) United States Patent
Li et al.

(10) Patent No.: US 11,803,224 B2
(45) Date of Patent: Oct. 31, 2023

(54) POWER MANAGEMENT METHOD, MULTI-PROCESSING UNIT SYSTEM AND POWER MANAGEMENT MODULE

(71) Applicant: T-Head (Shanghai) Semiconductor Co., Ltd., Shanghai free trade area (CN)

(72) Inventors: Haoran Li, Shanghai (CN); Fei Sun, San Jose, CA (US)

(73) Assignee: T-Head (Shanghai) Semiconductor Co., Ltd., Shanghai free trade area (CN)

( * ) Notice: Subject to any disclaimer, the term of this patent is extended or adjusted under 35 U.S.C. 154(b) by 0 days.

(21) Appl. No.: 17/647,248

(22) Filed: Jan. 6, 2022

(65) Prior Publication Data
US 2023/0141475 A1 May 11, 2023

(30) Foreign Application Priority Data
Nov. 5, 2021 (CN) .......................... 202111305462.0

(51) Int. Cl.
*G06F 1/28* (2006.01)
*G06F 1/30* (2006.01)
*G06F 1/32* (2019.01)
*G06F 1/3234* (2019.01)

(52) U.S. Cl.
CPC .............. *G06F 1/3234* (2013.01); *G06F 1/28* (2013.01)

(58) Field of Classification Search
CPC ..... G06F 1/28; G06F 1/30; G06F 1/32; G06F 1/3234
See application file for complete search history.

(56) References Cited

U.S. PATENT DOCUMENTS

| 7,519,838 B1* | 4/2009 | Suurballe | G06F 1/3203 |
| | | | 713/300 |
| 11,481,013 B2* | 10/2022 | Rajwan | G06F 1/324 |
| 2012/0023351 A1* | 1/2012 | Wakrat | G06F 1/3268 |
| | | | 713/340 |

(Continued)

*Primary Examiner* — Mark A Connolly
(74) *Attorney, Agent, or Firm* — Finnegan, Henderson, Farabow, Garrett & Dunner, LLP

(57) ABSTRACT

The present disclosure provides a power management method, a multi-processing unit system, and a power management module thereof. The multi-processing unit system comprises a plurality of local power management units and a global power management unit, each of the local power management units corresponds to a processing unit of the multi-processing unit system. The power management method comprises: obtaining, using the global power management unit, a global power budget for the multi-processing unit system; allocating, using the global power management unit, local power budget for each of the local power management units according to the global power budget and power management parameters of the processing units; managing, using the local power management unit, local power resources of corresponding processing unit based on the allocated local power budget; reporting, using the local power management unit, the power management parameters of the processing unit to the global power management unit. The present disclosure improves the overall power efficiency for the multi-processing unit system.

16 Claims, 8 Drawing Sheets

(56) References Cited

U.S. PATENT DOCUMENTS

| | | | |
|---|---|---|---|
| 2016/0026231 A1* | 1/2016 | Ignowski | G06F 1/3206 713/320 |
| 2016/0147280 A1* | 5/2016 | Thomas | G06F 1/3243 713/320 |
| 2019/0377395 A1* | 12/2019 | Kaburlasos | G06F 1/3206 |

* cited by examiner

Obtaining a global power budget of a multi-computing unit system using a global power management unit
S210

Allocating, using the global power management unit, a local power budget for each computing unit according to the global power budget and power management parameters of each computing unit
S220

Managing, using a local power management unit, local power consumption resources of a corresponding computing unit according to the allocated local power budget
S230

Reporting, using the local power management unit, power management parameters of the corresponding computing unit to the global power management unit
S240

*FIG. 2*

POWER MANAGEMENT METHOD, MULTI-PROCESSING UNIT SYSTEM AND POWER MANAGEMENT MODULE

CROSS-REFERENCE TO RELATED APPLICATIONS

The present disclosure claims benefits of and priority to Chinese patent application No. 202111305462.0, filed on Nov. 5, 2021, the content of which is incorporated herein by reference in its entirety.

TECHNICAL FIELD

The present disclosure relates to the field of computer, and in particular to a power management method, a multi-processing unit system and a power management module thereof.

BACKGROUND

In the power management of a multi-processing unit system such as a multi-processor, the power consumption of the system is closely related to its performance. When the power demands of the processing units cannot be fully satisfied, the performance of some processing units will decrease, leading to the occurrence of phenomena such as dark silicon. When the power demand of each processing unit is fully satisfied, the overall power consumption of the multi-processing unit system may become too large, resulting in waste of resources and poor energy efficiency for both overall power consumption and local power consumption.

In general, the power management of multi-processing unit system may be performed as centralized or distributed power management. For the centralized power management, each processing unit shares the substantially same power budget and performs power management separately. However, the power consumption required by each processing unit during actual running is greatly different, and the same power budget is not conducive to achieving better overall power consumption efficiency. For the distributed power management, respective power budget allocation and management would be performed for different processing units. The power efficiency for each processing unit is more efficient by itself but is not conducive to the overall power efficiency for the entire multi-processing unit system.

Therefore, there is room to improve the overall power efficiency for both centralized power management and distributed power management.

SUMMARY

In view of this, embodiments of the present disclosure provide a power management method, a multi-processing unit system and a power management module thereof in order to improve the overall power efficiency of a multi-processing unit system.

According to some embodiments of the present disclosure, a power management method for a multi-processing unit system is provided. The multi-processing unit system comprises a plurality of local power management units and a global power management unit, each local power management unit corresponding to a processing unit of the multi-processing unit system. The method comprises: obtaining, using the global power management unit, a global power budget for the multi-processing unit system; allocating, using the global power management unit, local power budget for each processing unit based on the global power budget and power management parameters of each processing unit; managing, using the local power management unit, local power resources of a corresponding processing unit based on the allocated local power budget; reporting, using the local power management unit, parameters of the processing unit to the global power management unit.

In some embodiments of the present disclosure, the power management parameters comprise at least one of energy consumption parameters, performance parameters and workload parameters. The energy consumption parameters comprise at least one of power consumption values, power states and local budget utilization rates.

In some embodiments of the present disclosure, the obtaining the global power budget for the multi-processing unit system comprises: determining the global power budget based on previous power management parameters of the processing units and the previous global power budget.

In some embodiments of the present disclosure, the determining the global power budget based on the previous power management parameters of the processing units and the previous global power budget comprises: determining the global power budget, using a first machine learning model or a first rule, based on the previous power management parameters of the processing units and the previous global power budget, such that a predicted power utilization rate of the global power budget is not lower than an actual power utilization rate of the previous global power budget.

In some embodiments of the present disclosure, wherein the determining the global power budget based on the previous power management parameters of each processing unit and the previous global power budget comprises: determining the global power budget of the multi-processing unit system of a second power management period, based on the power management parameters of the processing units of a first power management period and the global power budget of the multi-processing unit system of the first power management period. The second power management period follows the first power management period, and the first power management period and the second power management period form a consecutive power management period.

In some embodiments of the present disclosure, wherein the allocating the local power budget for each of the processing units based on the global power budget and the power management parameters of each of the processing units comprises: allocating the local power budget of each processing unit for the second power management period, based on the global power budget of the multi-processing unit system for the second power management period and the power management parameters of each processing unit of the first power management period.

In some embodiments of the present disclosure, the allocating the local power budget for each processing unit based on the global power budget and the power management parameters of each processing unit comprises: determining an overall power budget for the processing units from the global power budget; allocating a local power budget for each of the processing units, based on the overall power budget for the processing units and the power management parameters of each of the processing units.

In some embodiments of the present disclosure, the allocating the local power budget for each of the processing units based on the overall power budget of the processing units and the power management parameters of each of the processing units comprises: allocating, using a second rule, the local power budget for each of the processing units based on the overall power budget of the processing units and the power management parameters of each of the processing units, or, obtaining the local power budget for each of the processing units from a second machine learning model, based on using the overall power budget of the processing units and the power management parameters of each of the processing units as input to the second machine learning model. The obtaining the local power budget for each of the processing units from the second machine learning model, based on using the overall power budget of the processing units and the power management parameters of each of the processing units as input to the second machine learning model comprises: determining, based on the previous power management parameters of each of the processing units, a current power budget reference parameter for each of the processing units; inputting the current power budget reference parameter for each of the processing units and the current overall power budget for the processing units to the second machine learning model to obtain the local power budget for each of the processing units.

In some embodiments of the present disclosure, the multi-processing unit system further comprises shared resource shared by the processing units, wherein the assigning a local power budget of each of the processing units based on the global power budget and power management parameters of each of the processing units comprises: allocating a local power budget for each of the processing units based on the global power budget, power management parameters of each of the processing units and power management parameters of the shared resource.

In some embodiments of the present disclosure, the managing the local power resources of the corresponding processing units based on the allocated local power budget comprises: determining and executing a local power resource management strategy based on the allocated local power budget and power management parameters of the local power management unit. The local power resource management strategy comprises at least one of dynamic voltage frequency scaling, power gating, clock gating, clock frequency setting, and adjustment of an order of tasks to be performed.

In some embodiments of the present disclosure, the global power management unit performs a first process in the condition that the power management parameters of each processing unit meet a predetermined condition during the first power management period.

In some embodiments of the present disclosure, the power management parameters comprise power consumption values, the predetermined condition comprises: during the first power management period, a sum of the power consumption values of the processing units exceeding the global power budget of the first power management period.

In some embodiments of the present disclosure, the first process is one of the following: reducing the power consumption value of each of the processing units during the first power management period, such that the sum of the power consumption values of the processing units during the first power management period does not exceed the global power budget for the first power management period, or determining difference amount between the sum of the power consumption values of the processing units during the power management period and the global power budget of the first power management period, and subtracting the difference amount from the global power budget of the second power management period.

In some embodiments of the present disclosure, the global power management unit is located within one of the processing units or outside the plurality of processing units.

According to some embodiments of the present disclosure, a multi-processing unit system is provided. The multi-processing unit system comprises: a plurality of processing units; a global power management unit configured to obtain a global power budget of the multi-processing unit system, allocate a local power budget for each of the processing units based on the global power budget and power management parameters reported by each of the processing units; a plurality of local power management units, each of local power management units corresponding to a processing unit of the plurality of processing units, and configured to manage local power resources of corresponding processing units based on the allocated local power budget to perform tasks, and to report the power management parameters consumed while performing the tasks to the global power management unit.

In some embodiments of the present disclosure, the global power management unit comprises: a global storage unit configured to store the global power budget and the power management parameters of the processing units; a global management unit configured to allocate a local power budget for each of the processing units based on the global power budget and the power management parameters of each of the processing units.

In some embodiments of the present disclosure, the local power management unit comprises: a local storage unit configured to store the local power budget and power management parameters of the corresponding processing unit; and a local management unit configured to determine a local power resource management strategy based on the local power budget and power management parameters of the processing unit.

In some embodiments of the present disclosure, the multi-processing unit system is a distributed processing system, and the processing unit is a processing unit in the distributed processing system.

In some embodiments of the present disclosure, the multi-processing unit system is a multi-core processing unit, and the processing unit is a core in the multi-core processing unit.

According to some embodiment of the present disclosure, a power management module for a multi-processing unit system is provided. The power management module comprises: a plurality of local power management units, each of local power management unit corresponding to a processing unit in the multi-processing unit system respectively, the local power management unit being configured to manage the local power resources of the corresponding processing unit according to the allocated local power budget for performing tasks, and reporting to the global power management unit the power management parameters while performing the tasks.

In some embodiments of the present disclosure, the allocation of the local power budget for each processing unit takes into consideration of the power management parameters of each processing unit, rather than direct equal allocation among all processing units, such that the local power consumption budget more accurately reflects the actual demand of each processing unit, thereby improving the overall power consumption efficiency. In addition, the allocation of the local power budget for each processing unit are performed in further consideration of the constraints of the global power budget, to avoid the phenomenon that the power consumption efficiency of each processing unit is optimized, but the overall power consumption efficiency is low, thereby improving the overall power consumption efficiency of the multi-processing unit system.

BRIEF DESCRIPTION OF THE DRAWINGS

To describe the technical solutions in the embodiments of the present disclosure more clearly, the accompanying drawings required for describing the embodiments are briefly introduced below. It is apparent that the accompanying drawings described in the following are merely some embodiments of the present disclosure, and those of ordinary skill in the art can still derive other drawings from these accompanying drawings without creative efforts.

FIG. 2 is an example flow chart of a power management method according to some embodiments of the present disclosure.

DETAILED DESCRIPTION

In order to enable those skilled in the art to better understand the technical solutions in the embodiments of the present disclosure, the technical solutions in the embodiments of the present disclosure will be clearly and completely described below in conjunction with the accompanying drawings in the embodiments of the present disclosure. Apparently, the described embodiments are merely a part, instead of all, of the embodiments of the present disclosure. All other embodiments obtained by those of ordinary skills in the art based on embodiments among the embodiments of the present disclosure shall fall within the scope of protection of the embodiments of the present disclosure.

Specific embodiments of the present disclosure will be further described below in combination with the accompanying drawings.

Figure 1:
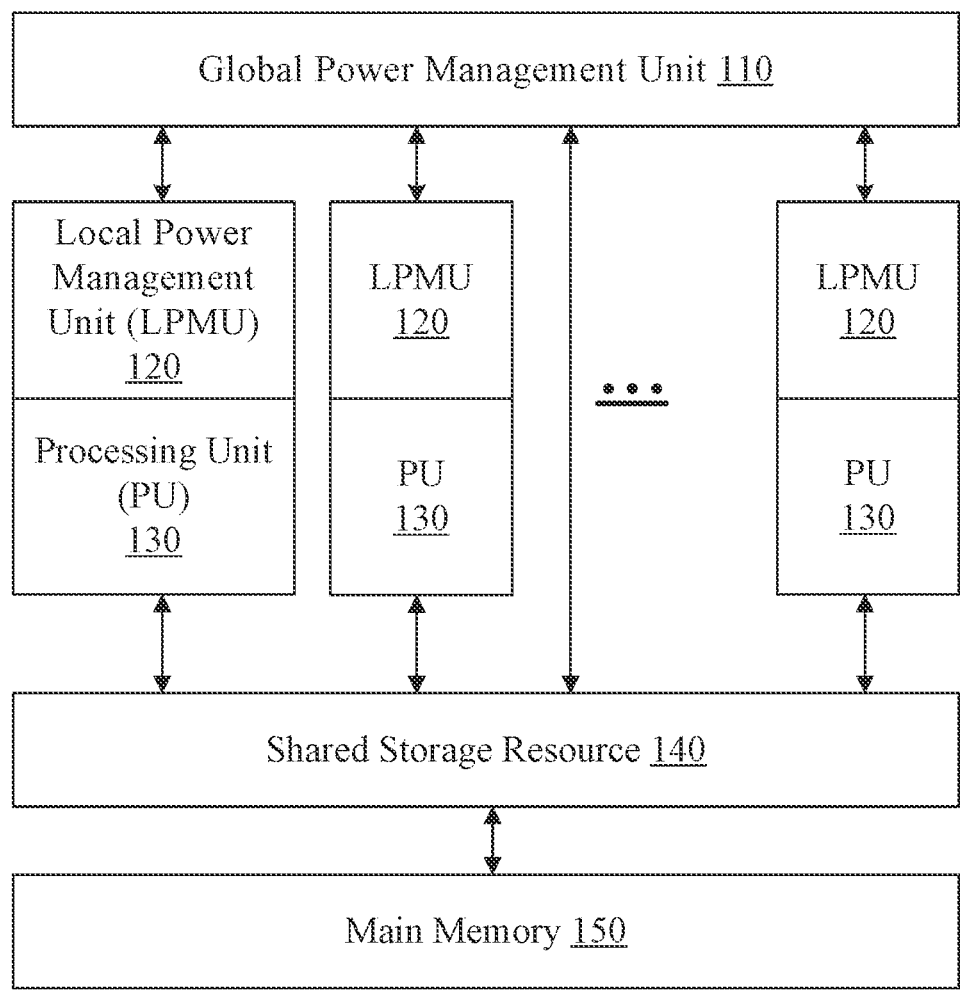
FIG. 1 is a schematic structural diagram of an example multi-processing unit system according to some embodiments of the present disclosure.

FIG. 1 illustrates a schematic structural diagram of an example multi-processing unit system according to some embodiments of the present disclosure. The multi-processing unit system 100 of FIG. 1 includes a global power management unit 110, a local power management unit 120, and a processing unit 130. In general, the multi-processing unit system 100 may be a data processing system integrated with multiple processing units, which may be for example, but not limited to, a multi-core processor, a multi-processor system, etc. The multi-core processor may comprise, but is not limited to, a multi-core CPU (Central Processing Unit) and GPU (Graphics Processing Unit). When the multi-processing unit system 100 is a multi-core CPU, the processing unit 130 may be CPU core. When the multi-processing unit system 100 is a GPU, the processing unit 130 may be SM (Streaming Multiprocessor) or SP (Streaming Processor). In addition to the processing unit, the multi-processing unit system 100 may also comprise shared resources such as shared storage resources or shared instruction scheduling resources. The shared storage resources may be implemented as one or more levels of caches consisting of Static Random-Access Memory (SRAM) or Dynamic Random-Access Memory (DRAM), and the shared instruction scheduling resources may be implemented as scheduling units.

It should also be understood that the global power management unit 110 may be configured as software or hardware for power management of the multi-processing unit system 100. The multi-processing unit system 100 is configured to perform power management over each of local power management unit 120, the global power management unit 110 itself, and one or more processing units 130 within the multi-processing unit system 100. The local power management unit 120 may correspond to one or more processing units 130 and is implemented by software or hardware configuration for power management of the one or more processing units 130 as well as the local power management unit 120 itself. It should also be understood that either of the global power management unit 110 and the local power management unit 120 may be implemented as a software configuration or a hardware configuration, and that the locations of the software configuration or hardware configuration are not restricted for various embodiments of the present disclosure. In one example, the global power management unit 110 may be configured as hardware or software outside of the processing unit 130, or alternatively, configured in the processing unit 130. In another example, the local power management unit 120 may be configured as hardware or software within or outside of the processing unit 130 that it manages.

There may be a plurality of local power management units 120 and a plurality of processing units 130. For example, FIG. 1 illustrates processing units 1-K and local power management units 1-K. Each local power management unit 120 and each processing unit 130 may have certain correspondence, which may be implemented as a one-to-one correspondence, or one local power management unit 120 corresponding to multiple processing units 130. In the present example, the local power management unit 120 and the processing unit 130 have a one-to-one correspondence for easy illustration. The multi-processing unit system 100 may further include shared storage resource 140 and a main memory 150, wherein the processing unit 130 may obtain instructions and data for data processing from the main memory 150. The shared storage resource 140 may serve as a cache, for example, a Last Level Cache (LLC), between the processing unit 130 and the main memory 150.

Specifically, the local power management unit 120 performs local power management for the corresponding processing unit 130, for example, the local power management unit 120 calculates power consumption based on respective local power budget. The global power management unit 110 performs power management globally, for example, the global power management unit 110 may perform power budget allocation for each of the processing units. In the case that the global power management unit 110 is configured in a processing unit, the power budget of the global power management unit 110 itself may be included in the local power budget of this processing unit. In the case that the global power management unit 110 is configured outside any one of the processing units, the global power management unit 110 may perform allocation of power budget on its own. In addition, the local power management unit 120 is configured in respective processing unit, the power budget of the local power management unit 120 may be included in the local power budget of the respective processing unit. In the case that the local power management unit 120 is configured outside any one of the processing units, the global power management unit 110 may perform allocation of power budget for the local power management unit 120.

Data communication may be performed between the local power management unit 120 and the global power management unit 110, and the global power management unit 110 may also communicate with the shared storage resource 140 to achieve better global power management described above.

It should also be understood that the multi-processing unit of FIG. 1 is only an exemplary structure, and other structural designs are also applicable to embodiments of the present disclosure.

FIG. 2 illustrates a flow chart of an example power management method according to some embodiments of the present disclosure. The multi-processing unit system to which the power management method of FIG. 2 may be applied to but is not restricted to the multi-processing unit system of FIG. 1, which includes a plurality of local power management units and a global power management unit. Each local power management unit corresponds to one processing unit in the multi-processing unit system. The method comprises following steps:

S210: obtaining, using a global power management unit, a global power budget for the multi-processing unit system.

S220: allocating, using the global power management unit, local power budget for each processing unit based on the global power budget and power management parameters of each processing unit.

S230: managing, using a local power management unit, local power resources of corresponding processing unit based on allocated local power budget of the corresponding processing unit.

S240: reporting, using the local power management unit, parameters of the processing unit to the global power management unit.

The power management method of FIG. 2 will be described in combination with the schematic structural diagram of the example multi-processing unit system of FIG. 1.

The global power management unit 110 obtains the global power budget of the multi-processing unit system 100. The global power management unit 100 allocates the local power budget for each processing unit 130 based on the global power budget and the power management parameters of each processing unit 130. The local power management unit 120 manages the local power resources of the corresponding processing unit 130 according to the allocated local power budget and reports the power management parameters of the processing unit 130 to the global power management unit 110.

It should be understood that the global power budget is the entire power budget demanded by the multi-processing unit system 100 to perform data process and may cover the power consumption of every part or unit of the multi-processing unit system 100.

In one example, the local power management unit 120 is configured in the corresponding processing unit 130, and the local power budget is the power budget allocated to the corresponding processing unit 130, and the global power budget includes the overall power budget allocated for all the processing units 130. The global power budget and the local power budget may be computed using power value or by power counter unit corresponding to power value. The power counter may be configured by components within the processing unit itself or may be configured in the form of software or hardware in the local power management unit 120 or the global power management unit 110.

In addition, local power resources refer to power-consuming hardware configuration or software configuration. The hardware configuration may be, e.g., a circuit element, and the software configuration includes tasks, such as CPU-based or GPU-based instruction processing, process handling, and data processing.

It should be understood that power management parameters refer to information or data related to power management, for example, data related to power consumption, performance parameters of the processing unit related to power management. The power management parameters of the processing unit 130 may include, but not limited to, at least one of energy consumption parameter, performance parameter, and workload parameter.

The energy consumption parameter of the processing unit 130 is data or information that represents the power consumption of the processing unit 130 while performing process tasks, and may include at least one of power consumption value, power states, and local budget utilization rate. The workload parameter of the processing unit 130 are parameters indicating the amount of data processed in the task performed by the processing unit 130 and may include but not limited to at least one of number of instructions, times of addressing, and main memory access latency and other factors for the process task. The performance parameter of the processing unit 130 are parameters representing the software or hardware performance of the processing unit 130, and may include, but not limited to, at least one of the clock frequency, the number of cores, the reference frequency, or the front side bus frequency.

In some embodiments of the present disclosure, the allocation of the local power budget for each processing unit takes into consideration the power management parameters of each processing unit, rather than direct equal allocation among all processing units, such that the local power consumption budget more accurately reflects the actual demand of each processing unit, thereby improving the overall power consumption efficiency. In addition, the allocation of the local power budget for each processing unit are performed in further consideration of the constraints of the global power budget, to avoid the phenomenon that the power consumption efficiency of each processing unit is optimized, but the overall power consumption efficiency is low, thereby improving the overall power consumption efficiency of the multi-processing unit system.

Figure 3A:
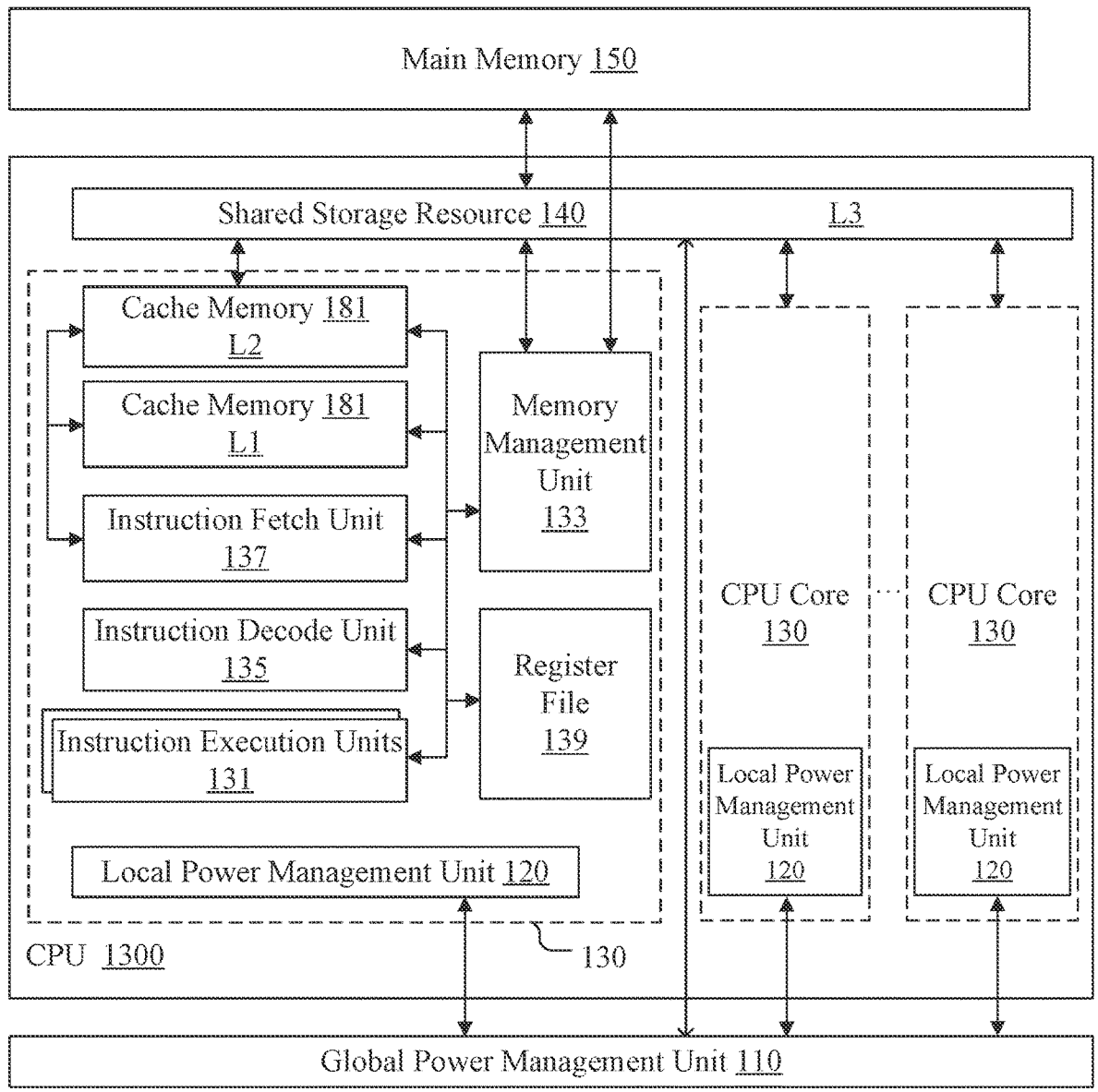
FIG. 3A is a diagram of a specific architecture of a processor (CPU) as another example of the multi-processing unit system of FIG. 1, according to some embodiments of the present disclosure.

Example embodiments of the processing unit and the processing logics of the power management method will be described in detail below with reference to FIGS. 3A-3C. It should be understood that the processing logics may be understood as sub-steps included in the power management method, which may be implemented by software configuration or by hardware configuration. FIG. 3A shows a specific structural diagram of a processor (CPU) as another example of the multi-processing unit system of FIG. 1, according to another embodiment of the present disclosure.

In some embodiments, CPU 1300 may include one or more CPU cores 130 (as an example of processing unit) for processing instructions, and the processing and execution of instructions may be controlled by the user (e.g., via an application program) or the system platform. In some embodiments, each CPU core 130 may be used to process a specific set of instructions. In some embodiments, the instruction set may support Complex Instruction Set Computing (CISC), Reduced Instruction Set Computing (RISC), or Very Long Instruction Word (VLIW). The different CPU cores 130 may each handle different instruction sets or the same instruction set. In some embodiments, CPU core 130 may also include other processing modules, such as a Digital Signal Processor (DSP), etc. As an example, processing unit cores 1-m are shown in FIG. 3A, with m being a non-zero positive integer.

In some embodiments, a cache memory may be fully or partially integrated into the CPU 1300 depending on architectures, and FIG. 3A illustrates three levels of cache memory, L1-L3. L3 140 may be internal cache memory configured outside of each processing unit core 101. L1 181 and L2 181 are internal cache memory inside each processing unit core 101, and L1-L3 may include instruction-oriented cache and data-oriented cache. In some embodiments, the various components in CPU 1300 may share at least a portion of the cache memory, for example, and processing unit cores 1-m may share a third level of cache memory L3. CPU 1300 may also include an external cache (not shown), and other cache architectures may also serve as external caches for CPU 1300.

In some embodiments, CPU 1300 may include register file 139. Register file 139 may include a plurality of registers for storing different types of data or instructions, which may be of different types. For example, register file 139 may include integer registers, floating point registers, status registers, instruction registers, and pointer registers, etc. The registers in register file 139 can be implemented as general-purpose registers or through specific design according to the actual demand of CPU 1300.

The CPU 1300 may include a Memory Management Unit (MMU) 133 for implementing the translation of virtual addresses to physical addresses. A portion of the table entries in the page table are cached in the Memory Management Unit 133, and the Memory Management Unit 133 may also fetch table entries from memory that are not cached. One or more memory management units 133 may be disposed in each CPU core 130, and memory management units 120 in different CPU cores 130 can also be synchronized with memory management units 120 located in other processing units or processing unit cores, allowing each processing unit or processing unit core to share a unified virtual storage system.

CPU 1300 is used to execute a sequence of instructions (i.e., a program), and the process of executing each instruction by CPU 1300 includes the steps of fetching an instruction from a memory where the instruction is stored, decoding the fetched instruction, executing the decoded instruction, storing the result of the instruction execution, and so on, until completing execution of all instructions in an instruction sequence or receiving a stop instruction.

To implement the above process, the CPU 1300 may include an instruction fetch unit 137, an instruction decode unit 135, an instruction issue unit (not shown), one or more instruction execution units 131, and an instruction retire unit (not shown), etc.

The instruction fetch unit 137 serves as the starting engine of the CPU 1300 for moving instructions from the main memory 150 to an instruction register (which may be a register for storing instructions in the register file 26 illustrated in FIG. 3A) and receiving the next fetch address or calculating the next fetch address based on a fetch algorithm which indicates, for example, incrementing addresses or decrementing addresses based on the instruction length.

After the instruction fetch, CPU 1300 enters the instruction decode stage where instruction decode unit 135 decodes the fetched instruction in accordance with the predetermined instruction format to obtain the operand fetch information for the fetched instruction, for the preparation of the one or more instruction execution units 131. The operand fetch information indicates pointing, for example, to an immediate number, a register, or other software/hardware capable of providing the source operand.

Instruction issue unit typically exists in high-performance CPU 1300 and is disposed between the instruction decode unit 135 and the one or more instruction execution units 131 for instruction scheduling and control, so as to efficiently dispatch individual instructions to different instruction execution units 131, thus enabling parallel operation of instructions. After an instruction is fetched, decoded, and dispatched to the corresponding instruction execution unit 131, the corresponding instruction execution unit 131 starts execution of the instruction, i.e., executing the operation indicated by the instruction to realizing the corresponding function.

The instruction retire unit (or referred to as an instruction return unit) is responsible for writing the execution results produced by the instruction execution unit 131 back to the corresponding storage position (e.g., a register inside the CPU 1300) so that subsequent instructions can quickly obtain the corresponding execution results from the storage position.

For instructions of different types, different instruction execution units 131 may be disposed in the CPU 1300 accordingly. The instruction execution unit 131 may be an arithmetic unit (e.g., including an arithmetic logic unit, a vector operation unit, etc., for performing operations based on operands and outputting the results of the operations), a memory access unit (e.g., for accessing a memory to read data in the memory or write specified data into the memory according to the instruction), and a co-processing unit, etc. In CPU 1300, each instruction execution unit 131 may run in parallel and output the corresponding execution results.

When executing certain types of instructions (e.g., access instructions), the instruction execution unit 131 may need to access the main memory 150 to obtain information stored in the main memory 150, or to provide data to be written to the main memory 150.

It should also be understood that both the global power management unit 110 and the local power management unit 120 may be provided outside or inside the CPU core. Referring to FIG. 3B, the global power management unit 110 may include a parameter acquisition logic unit 111, a budget acquisition logic unit 112, a budget allocation logic unit 113, and an issue logic unit 114. The parameter acquisition logic unit 111 is configured to acquire power management parameters from the local power management unit 120. At least a portion of the power management parameters may be obtained by monitoring the CPU core 130 managed by the local power management unit 120, and another portion of the power management parameters may be obtained by monitoring the shared resource, such as L3 140. The budget acquisition logic unit 112 is configured to obtain the global power budget, which may be a predetermined value or may be obtained by processing the power management parameters obtained by the parameter acquisition logic unit 111. The budget allocation logic unit 113 may allocate the local power budget for each CPU core 130 based on the global power budget obtained by the budget acquisition logic unit 112 and the power management parameters obtained by the local power management unit 120, and the allocation result is issued to the local power management unit 120 via the issue logic unit 114. And the local power management unit 120 may allocate the local power budget for each CPU core 130 based on the local power management parameters obtained by the budget acquisition logic unit 112 and the local power management unit 120. The local power management unit 120 manages the power consumption of the CPU core 130 based on the local power budget as the result of the allocation.

Figure 3B:
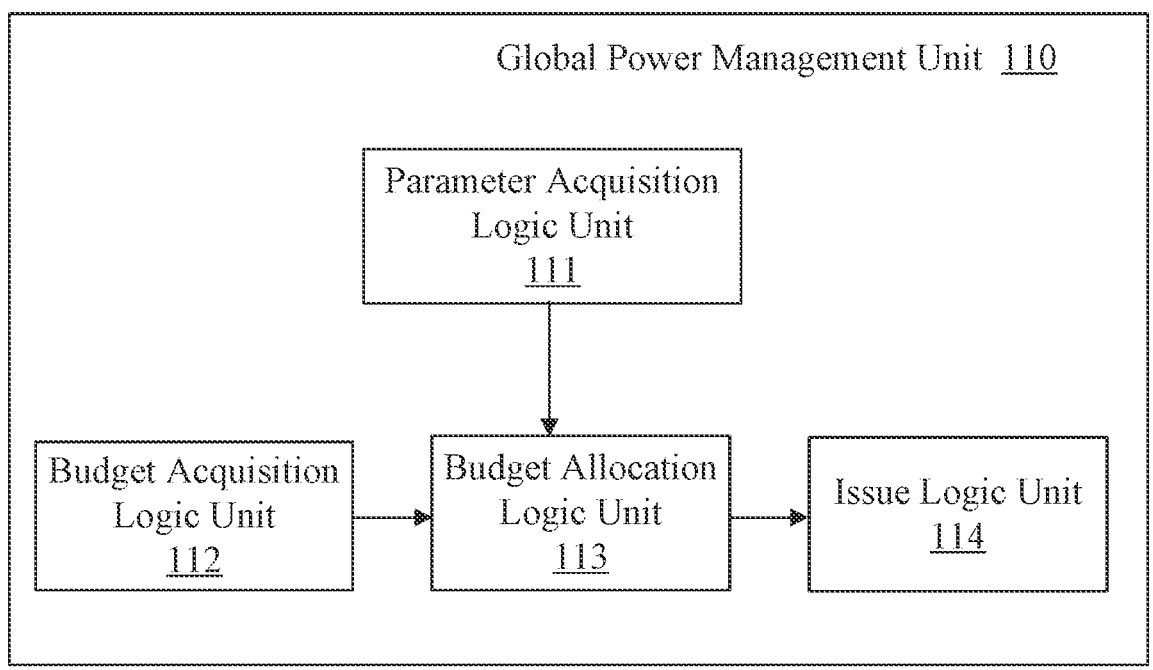
FIG. 3B is a block diagram of the processing logic of the global power management unit corresponding to the example processor architecture of FIG. 3A, according to some embodiments the present disclosure.
Figure 3C:
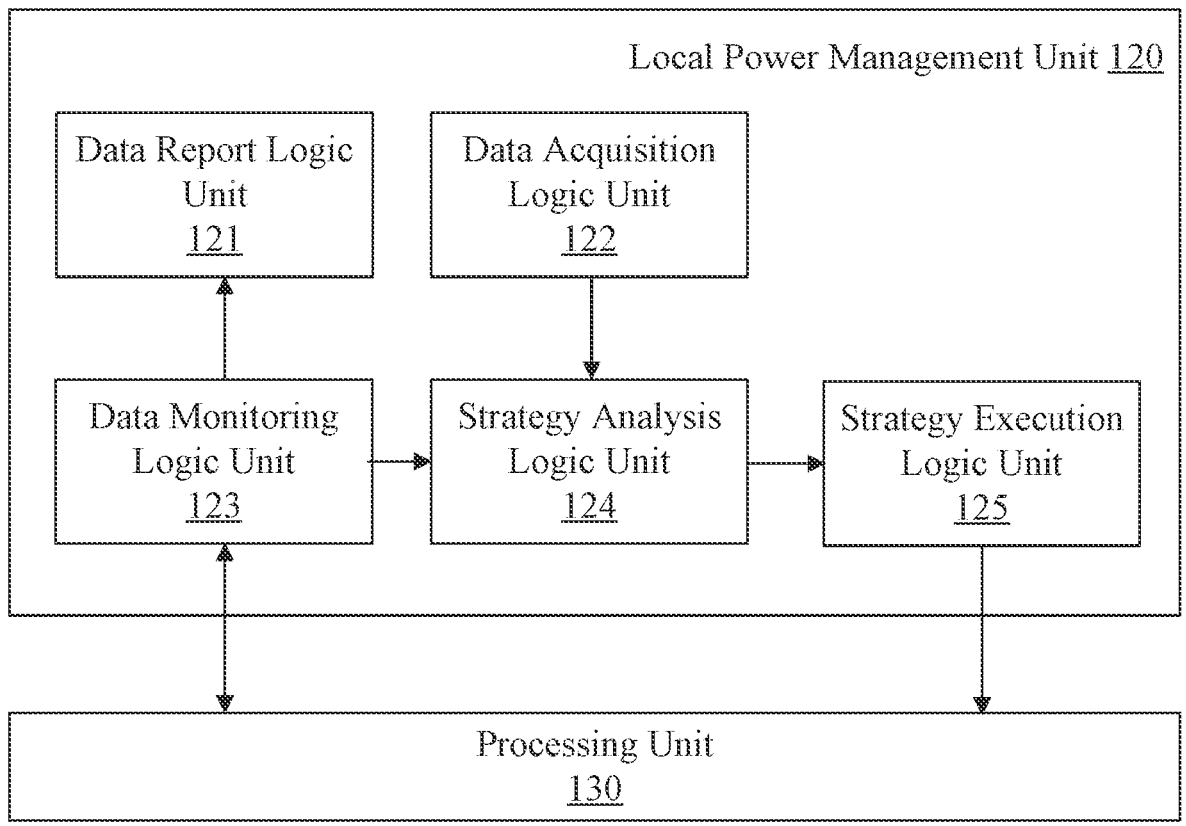
FIG. 3C is a block diagram of processing logic of a local power management unit corresponding to the example processor architecture of FIG. 3A, according to some embodiments the present disclosure.

Referring to FIG. 3C, the local power management unit 120 may include a data report logic unit 121, a data acquisition logic unit 122, a data monitor logic unit 123, a strategy analysis logic unit 124, and a strategy execution logic unit 125. The data monitor logic unit 123 is configured to monitor the real-time power management parameters of the CPU core 130 and issue the real-time power management parameters to the strategy analysis logic unit 124. The real-time power management parameters include at least one of the energy consumption parameters, performance parameters, and workload parameters of the CPU core 130.

The data report logic unit 121 is configured to report the monitored real-time power management parameters of the CPU core 130 to the global power management unit 110, for example, to the parameter acquisition logic unit 111. It should be understood that the data report logic unit 121 may perform direct or indirect reporting of the real-time power management parameters according to the power management periods set by the global power management unit 110. Direct reporting refers to forwarding the monitored real-time power management parameters to the global power management unit 110 directly without processing, and indirect reporting refers to reporting real-time power management parameters to the global power management unit 110 after certain processing, such as statistical process, feature extraction, etc.

The data acquisition logic unit 122 is at least configured to acquire the allocated local power budget from the global power management unit 110, such as obtaining the local power budget from the issue logic unit 114 of the global power management unit 110. The data acquisition logic unit 122 may also be configured to obtain configuration information from, for example, a user interface. The configuration information includes, but not limited to, correspondence between power states of the resource management task and the power management parameters. The data acquisition logic unit 122 may be further configured to send the local power budget, configuration information, and so on. to the strategy analysis logical unit 124.

The strategy analysis logic unit 124 is configured to determine the power state of the resource management task based on the local power budget, configuration information, and power management parameters, and to send the power state of the resource management task to the strategy execution logic unit 125.

The strategy execution logic unit 125 is configured to execute the resource management task under the power state and generate control commands to be sent to the processing unit 130. It should be understood that after the processing unit 130 executes instructions based on control commands, the power management parameters of the CPU core 130 monitored by the data monitor logic unit 123 may vary. In one example, the data monitor logic unit 123 monitors the power management parameters of the CPU core 130 by a monitoring period shorter than the power management period of the global power management unit 110. Preferably, the power management period is an integral multiple of the monitoring period.

As an example, for a global power consumption management unit 110 configured as shown in FIG. 3B, step S210 may be performed by the budget acquisition logic unit 112 and step S220 may be performed by the budget allocation logic unit 113. For the local power management unit 120 configured as shown in FIG. 3C, step S230 may be executed through data acquisition logic unit 122, strategy analysis logic unit 124 and strategy execution logic unit 125, and step S240 may be executed through data monitoring logic unit 123 and data reporting logic unit 121.

It should be understood, however, that the configurations of the global power consumption management unit 110 and the local power consumption management unit 120 as shown in FIG. 3B and FIG. 3C are merely example descriptions, and the configurations of the global power management unit 110 and the local power management unit 120 of embodiments of the present disclosure are not limited to the above examples.

Various possible implementations of the method as shown in FIG. 2 will be described and illustrated in detail below. It should be understood that examples in the following may be applied to the multi-processing unit system in above embodiments, but not limited to those embodiments. In other words, the global power management unit may be the global power management unit 110 in the above-described embodiments; the local power management unit may be the local power management unit 120 in the above-described embodiments.

Specifically, step S210 may be implemented as: determining the global power budget based on previous power management parameters and previous global power budget of the processing units. The previous power management parameters are the power management parameters obtained by using the previous global power budget to perform power management on all the power units, and also are result of power management based on previous local power budget. Alternatively, the power management parameters may be obtained not only with reference to previous power management parameters, but also current power management parameters during the utilization of current global power budget. Previous data reflects the results of power management based on the previously allocated local power budget and has higher reference value in power management for the current local power budget allocation, thus is beneficial in determining a global power budget that better meets the needs and facilitates dynamic power management.

In some examples, step S210 may be implemented as follows: determining the (e.g., current) global power budget, using a first machine learning model, based on previous power management parameters of each processing unit and the previous global power budget. The first machine learning model is used to improve the efficiency of determining global power budget and is able to learn the intrinsic relationship between the previous data and the current data, thus improving the accuracy of the global power budget. It should be understood that in this example, the global power budget determined in this step is the current global power budget, and subsequent allocation of the current local power budget for each processing unit may be performed based on the current global power budget. It should be understood that each local power management unit may perform power management for the corresponding processing unit based on the current local power budget allocation to obtain current power management parameters.

The management objective of the global power budget may be that the predicted power consumption rate of the global power budget is not lower than the actual power consumption rate of the previous global power budget, thereby improving the power consumption rate of the global power budget to a better extent and improving the overall energy efficiency of the multi-processing unit system. The management objective of the global power budget may also allow power consumption of the processing units exceeding a preset threshold (or percentage) of current global power budget within a preset duration. If the entire power consumed based on current global power budget exceeds this preset threshold, then after an initial value of the next global power budget is determined, the initial value can be reduced to an actual value, for example, by multiplying the initial value with a ratio less than 1. If the entire power consumed based on the global power budget does not exceed the preset threshold, then the initial value of the next global power budget can directly be determined as the actual value without applying ratio deduction.

In addition, the power consumption rate or actual power consumption value of the global power budget may be calculated, and the first machine learning model may be further trained based on the power consumption rate or actual power consumption value, and also corresponding power management parameters as training samples to update the first machine learning model.

It should be understood that the first machine learning model may be, but not limited to, feedforward neural networks (FNN), convolutional neural networks (CNN), recurrent neural networks (RNN), etc., and respective training methods may be, but are not limited to, supervised learning, unsupervised learning, and reinforcement learning. The global power management unit may include an interface, which may be communicatively connected to the main memory, for deploying and updating the first machine model.

Alternatively, step S210 may be implemented as follows: determining the global power budget based on previous power management parameters of the processing units and the previous global power budget by using a first rule, the first rule indicating a rule for adjusting the global power budget based on the previous power management parameters such that the predicted power consumption rate of the current global power budget is not lower than the actual power consumption rate of the previous global power budget. On one hand, the first rule may correspond to the management objectives of the global power budget described above, in other words, the first rule may be set such that the determined global power budget achieves the predetermined management objectives. On the other hand, the first rule may be implemented in a software manner, which improves the configuration efficiency by user, especially when the power management has different strategies depending on the scenario or the tasks performed by the multi-processing unit system, and the set first rule improves the flexibility of the power management.

In some other embodiments, step S210 may also be implemented as follows: determining the global power budget of the multi-processing unit system of the second power management period, based on the power management parameters of each processing unit of a first power management period and the global power budget of the multi-processing unit system of the first power management period, thereby improving the time efficiency and reliability of the global power management. With respect to the first power management period and the second power management period described above, the second power management period may follow the first power management period. In addition, the first power management period and the second power management period may form a consecutive power management period or a non-consecutive power management period.

In addition, the respective durations of the first power management period and the second power management period may be set arbitrarily, for example, the duration of the first power management period and the duration of the second power management period may be set independently. Preferably, the first power management period and the second power management period may be two consecutive periods with equal duration, in order to improve the reliability of power management.

In addition, the first power management period and the second power management period may refer to periods for performing different tasks or different periods for performing the same tasks, and the above tasks may be power resource management tasks including clock frequency management and operating voltage management. Preferably, the first power management period and the second power management period may be set to be used to perform two consecutive power resource management tasks, respectively.

The embodiments of FIG. 2 may further include the step that the global power management unit performs a first process if the power management parameters of the first power management period of each processing unit meet predetermined conditions. It should be understood that the first process may be the power management of the global power management unit between different power management periods, and the different power management periods may be consecutive power management periods or non-consecutive power management periods. The first process achieves the power management among different power management periods according to the predetermined conditions, thus further improving the efficiency and reliability of the dynamic management.

Accordingly, in another example of step S210, the global power management unit may also determine the global power budget of the second power management period based on the result of the first process, and the first process indicates management on the global power budget among different power management periods.

Embodiments of the first process corresponding to different predetermined conditions will be given exemplarily below.

For example, the predetermined condition may be that the sum of the power consumption values of each processing unit during the first power management period exceeds the global power budget of the first power management period, and accordingly, the global power management unit may reduce the local power budget of each processing unit of the first power management period so that the sum of the power consumption values of the processing units during the first power management period does not exceed the global power budget of the first power management period. And the global power management unit would not consider the previous power consumption values when making the budget allocation of the second power management period. In addition, the global power management unit may also accumulate the remaining unconsumed budget of the global power budget of the first power management period into the budget allocation of the second power management period, thus enabling better global dynamic power management.

In addition, the first process performed under the predetermined condition may be used to ensure the run-time power of each processing unit during the second power management period in accord with the local power budget of the second power management period. And the first process may also be used to ensure the run-time power of each processing unit during the second power management period in accord with the product of the local power budget of the second power management period and a predetermined ratio, with the predetermined ratio being less than 1.

For example, the predetermined condition may be that the sum of the power consumption values of the processing units during the first power management period does not exceed the global power budget of the first power management period. And accordingly, the global power management unit may determine the difference amount by which the sum of the power consumption values of the processing units during the first power management period exceeds the global power budget and offset the global power budget of the second power management period by the difference amount, thereby better achieving global dynamic power management, and avoiding device malfunction due to, for example, real-time global power budget shortage. More specifically, the global power management unit may determine the difference between the sum of the run-time power reported by the processing units and the local power budget during the second power management period, and then apply the difference decrement for the global power budget upon obtaining the global power budget for a third power management period following the second power management period.

Further, in the case that the global power budget is determined based on parameters from the first power management period and the second power management period in step 210, step S220 may be implemented as follows: allocating the local power budget for each processing unit in the second power management period based on the global power budget of the multi-processing unit system in the second power management period and the power management parameters of each processing unit during the first power management period, so that not only the management of the global power budget but also the allocation of the local power budget is achieved based on the first power management period and the second power management period, thus improving the unification and consistency of the management periods in dynamic power management.

In the case that the first power management period and the second power management period form a consecutive power management period, the power management may be managed in more real-time. In other words, each time point is located within a power management period, and the power management parameters at any time point may both be used for the determination of the global power budget and the allocation of the local power budget. It should be understood that consecutive power management periods mean that the ending time point of the first power management period is the starting time point of the second power management period.

In the case that the first power management period and the second power management period form a non-consecutive power management period, the power management parameters during the first power management period and the second power management period alone can be used to determine the global power budget. In other words, the portion of time other than the first power management period and the second power management period will not be referenced for power management. It should be understood that a non-consecutive power management period has a time gap greater than zero between the ending time point of the first power management period and the starting time point of the second power management period. Therefore, the power management parameters during the first power management period and the second power management period may be viewed as sampled data with reference value, and sampled data is utilized to determine the global power budget, thus improving data process efficiency.

In step S220 of allocating the local power budget for each processing unit, it may be specifically implemented as follows: a second rule may be used to allocate the local power budget for each processing unit in the second power management period. Several embodiments of the second rule will be explained exemplarily below.

For example, the overall power budget allocated to the processing units within the global power budget may be determined first, and the power consumption share of each processing unit in the second power management period may be determined based on the power management parameters of each processing unit in the first power management period. Then the local power budget of each processing unit in the second power management period may be determined from the overall power budget based on the power consumption share of each processing unit. In order to determine the power consumption share of each processing unit in the second power management period, the target workload for performing the process tasks, indicated by the workload parameters of each processing unit in the second power management period, may be obtained. Then the predicted power consumption value required for each processing unit to complete the above target workload may be calculated based on the hardware performance and software performance indicated by the performance parameters. The power consumption share may be the ratio of the predicted power consumption of the processing units to the sum of the individual predicted power consumption values. It should be understood that the power management parameters may be indicative of actual power consumption, and for individual processing units, the more actual power consumption during the first power management period is, the more local power budget during the second power management period is allocated.

In another example, in determining the overall power budget allocated to each processing unit from the global power budget, the power budget of the global power management unit may be excluded from the global power budget so as to obtain the overall power budget of the processing units. It should also be understood that the power budget of the global power management unit may be set to a predetermined value. Alternatively, a statistical value (e.g., an average value) of the power consumption of the global power management unit during a statistical period may be obtained. In the case that the global power management unit itself performs stable data processes and power management, not only the power budget of the global power management unit is allocated with the global power budget, but the power budget of the global power management unit is accurately calculated. It should also be noted that the statistical period may be longer than the power management period. For example, when the first power management period and the second power management period have equal length, and the statistical period may be of a length in multiples to that of the power management period.

For yet another example, the previous power management parameters of the global power management unit itself may be obtained and combined with the power management parameters of the processing units in previous power management period for power budget allocation. For example, the previous power consumption shares of the global power management unit and the processing units may be calculated, and the current global power budget may be allocated according to the previous power consumption shares, thereby providing a uniform dynamic allocation for the power budget of the global power management unit itself and the local power budget of the processing units. It should be understood that when the global power management unit performs power budget allocation across power management periods, the current global power budget may include the remaining power budget from the previous global power budget that is not consumed, or alternatively, the current global power budget may be excluded of the overconsumed part from the previous global power budget.

Alternatively, step S220 may be specifically implemented as follows: the power budget allocation may be performed using a second machine learning model which may be obtained by pre-training the neural network. The input to the second machine learning model may be determined based on the global power budget of the multi-computer system of the second power management period and the power management parameters of each processing unit of the first power management period, then the local power budget of each processing unit of the second power management period is output from the second machine learning model.

The input of the second machine learning model may be determined by directly extracting features from the global power budget of the multi-processing unit system of the second power management period and the power management parameters of each processing unit of the first power management period. Alternatively, the overall power budget of the processing units may be firstly determined from the global power budget of the second power management period, then the input of the second machine learning model may be obtained by extracting features from the overall power budget and the power management parameters of each processing unit of the first power management period. Alternatively, the input of the second machine learning model may be determined based on the power management parameters of each processing unit of the first power management period, in order to output the power consumption share of each processing unit of the first power management period, then the local power budget of each processing unit of the second power management period may be allocated, based on the power consumption shares, from the global power budget of the first power management period or the overall power budget of the processing units of the first power management period.

In a specific example, the global power budget of the multi-processing unit system of the second power management period is the same as the global power budget of the multi-processing unit system of the first power management period. In other words, the local power budget allocation of each processing unit is performed in the case of the global power budget of the multi-processing unit system. In another specific example, the overall power budget of the processing units of the first power management period is the same as the overall power budget of the second power management period. In other words, the local power budget allocation for each processing unit is performed while the overall power budget of the processing units remains. In the above-mentioned two specific examples, the second rule are simpler, or the second machine learning model are more efficient, thus improving the efficiency of the allocation of the local power budget.

In addition, step S220 may be implemented as follows: determining the overall power budget of the processing units and the power budget of the global power management unit in the global power budget and allocating the local power budget for each processing unit based on the overall power budget of the processing units and the power management parameters of each processing unit, thereby improving the efficiency of allocation of the local power budget.

In an example, the local power budget of each processing unit may be allocated using the second rule, based on the overall power budget of the processing units and the power management parameters of each processing unit. The second rule may be implemented in a software manner in order to improve the efficiency of the allocation of the local power budget. Especially when the power allocation strategies vary depending on the power management scenarios or the tasks performed by the multi-processing unit system, the set second rule is beneficial for the flexibility of the power management.

In another example, the local power budget of each processing unit may be obtained based on the overall power budget of the processing units and the power management parameters of each processing unit as the input of the second machine learning model. The employment of the second machine learning model may improve the allocation efficiency of the local power budget and improve the accuracy of the allocation of the local power budget by learning the intrinsic relationship between the power management parameters and the local power budget of each processing unit.

Specifically, the current power budget reference parameters of each processing unit may be determined based on the previous power management parameters of each processing unit, and the current power budget reference parameters of each processing unit and the current overall power budget of the processing units may be input to the second machine learning model to obtain the local power budget of each processing unit.

For example, the second machine learning model may be pre-trained model through a supervised training or unsupervised training. The direct or indirect input to the second machine learning model may include current power budget reference parameters of each processing unit, and the current power budget reference parameters may be data determined based on previous power management parameters, such as power feature data of each processing unit obtained by extracting features from previous power management parameters of each processing unit. The output of the second machine model may be the local power budget for each processing unit, or data indicative of the local power budget. It should be understood that the determination of the power budget reference parameter may be performed for each processing unit. In other words, the current power budget reference parameters of each processing unit are determined based on the previous power management parameters of that processing unit. A plurality of processing units may otherwise be grouped, and the power budget reference parameter may be determined for those processing units within each group. In other words, the current overall power budget reference parameter for the processing units within each group may be determined based on the previous overall power management parameters of the processing units within that group. It should be understood that the processing units may be grouped according to the correlation between process tasks performed by the processing units. Further, the grouping may be performed in the global power management unit, for example, the global power management unit may perform a clustering process based on the power management parameters of the processing units, identify those processing units in each cluster as related processing units, and then determine the current power budget reference parameters of the processing units in that cluster based on the previous power management parameters of that cluster as a whole. In the case of a large number of processing units, the grouping can improve the efficiency of process through the second machine learning model while ensuring the accuracy of the allocation of the power budget and improve the power efficiency of the GPU especially when the processing units are SMs or SPs in the GPU.

For another example, the second machine learning model may be a reinforcement learning model. The current power budget reference parameters of each processing unit may serve as states and rewards of the reinforcement learning model, and the reinforcement learning model may, based on the states and rewards, predict the current execution strategy, for example, the current local power budget of each processing unit. The rewards of the reinforcement learning model may indicate at least one of budget utilization rates, budget allocation errors or budget allocation error rates.

It should be understood that the second machine learning model includes, but is not limited to, feedforward neural networks, convolutional neural networks, recurrent neural networks, etc. Training methods for the model include, but are not limited to, supervised learning, unsupervised learning, and reinforcement learning. The global power management unit may include an interface for deploying and updating the second machine model, which may be communicatively connected to the main memory.

In a specific example, power budget reference parameters of each processing unit of the second power management period may be calculated based on the power management parameters of each processing unit of the first power management period, as the states and rewards of the reinforcement learning model corresponding to the first power management period. For example, the states and rewards of the reinforcement learning model may be calculated at the end of the first power management period. Alternatively, the power management parameters of each processing unit during the first power management period are obtained at the end of the first power management period, and then the states and rewards of the first power management period are calculated at the beginning of the second power management period. It should be understood that the first power management period and the second power management period may be defined and determined as described above and will not be repeated herein. It should also be understood that in calculating the states and rewards of the first power management period, the calculation may be performed based on the power management parameters of each processing unit and other data. For example, other data may include the local power budget each processing unit or the overall power budget of the processing units during the first power management period, the calculated states and reward can more accurately reflect the feedback results of the above-mentioned local power budget allocation.

In addition, step S220 may also be implemented as follows: the local power budget of each processing unit may be allocated based on the global power budget, the power management parameters of each processing unit, and other data. The other data includes the power management parameters of the shared resources. The shared resources may include the shared storage resources such as the last level cache as described above, with consideration of the power management parameters of the shared resources, the accuracy of the allocation of the local power budget is further improved.

In addition, step S230 may be implemented as follows: the local power resource management strategy may be determined and executed based on the allocated local power budget, and the power management parameters of the local power management unit. It should be understood that the local power resource management strategy includes at least one of dynamic voltage and frequency scaling (DVFS), power gating, clock gating, clock frequency setting, and adjustment of the order of the multiple tasks to be performed. It should be understood that DVFS is a method that can dynamically change the voltage and frequency of the processing unit while the program is executing in the processing unit, effectively improving the energy efficiency of the processing unit. Power gating may be used to turn off a power supply for a portion of the circuitry in the processing unit that is not currently operating for the purpose of saving power. Clock gating is an effective means of reducing the power consumption of the processing unit. For example, clock gating can manage the dynamic power consumption caused by the register flip corresponding to the processing unit.

In one example, step S230 may be implemented specifically as follows: the local power resource management strategy may be determined using a third machine learning model, based on the allocated local power budget and the power management parameters of the local power management unit. The third machine learning model may be a pre-trained neural network model, and the allocated local power budget and the power management parameters of the local power management unit may be used as direct or indirect inputs to the third machine learning model, and the local power resource management strategy may be used as direct or indirect outputs of the third machine learning model. The third machine learning model may improve the analysis efficiency of the local power resource management strategy and may learn the intrinsic relationship between the power management parameters and the local power budget of the processing units, with the local power resource management strategy, thus improving the reliability and efficiency of the local power management. More specifically, the third machine learning model is able to learn the intrinsic relationship between at least one of dynamic voltage frequency scaling, power gating, clock gating, clock frequency setting and adjustment of the order of multiple tasks to be performed, with the power management parameters and the local power budget, thus enabling accurate power management of the processing units.

It should be understood that the third machine learning model includes, but is not limited to, FNN, CNN RNN, etc. and respective training methods for the model include but are not limited to supervised learning, unsupervised learning, and reinforcement learning. The local power management unit may include an interface which may be communicatively connected to the main memory or the global power management unit, for deploying and updating the third machine model. The third machine learning model may also be deployed or updated through the global power management unit.

In another example, step S230 may be implemented as follows: the local power resource management strategy may be determined using a third rule, based on the allocated local power budget and the power management parameters of the local power management unit. The third rule may be implemented in a software manner, or in a hardware manner such as a digital circuit, improving the analytical efficiency of the local power management strategy. The third rule is beneficial for the flexibility of the power resource management strategy, especially when the power resource management strategies vary due to different power management scenarios of the processing units or different tasks performed by the processing units.

In one example, the third rule indicates the correspondence between the power state with the clock frequency or voltage in the local power management strategy. The power state may be firstly determined based on the power management parameters of the local power management unit, and the voltage or clock frequency having that power state may be determined by looking up the third rule, and then power management instructions for the local power management strategy may be generated based on that voltage or clock frequency.

In another example, the third rule indicates the relationship between the power adjustment strategy with the clock frequency or voltage, and the power adjustment strategy indicates increasing power or decreasing power with predetermined steps. The current voltage or clock frequency may be determined by periodically determining the power management parameters of the local power management unit, and then the power adjustment strategy corresponding to the current voltage or clock frequency may be determined by periodically looking up the third rule, and then the power management instructions indicating the power adjustment strategy may be generated based on that voltage or clock frequency. In addition, the third rule may also include the relationship between the predetermined step size with the clock frequency or voltage, and accordingly in this case, the above power management instructions may also be generated considering the current predetermined step size.

Possible implementations of the local power resource management strategy performed by the processing unit will be described below again with reference to FIG. 3C, and the implementation of management strategies of the processing units may be the same or different.

The strategy analysis logic unit 124 may generate control instructions based on at least one of dynamic voltage and frequency scaling (DVFS), power gating, clock gating, clock frequency setting, and adjustment of the order of the multiple tasks to be performed. Control instructions correspond to the control circuit to execute the strategy, and control circuit may be part of the digital circuitry in the CPU core 130, or digital or analog circuitry corresponding to the CPU core 130. For example, regarding DVFS, the control instructions instruct the control circuit to perform dynamic voltage and frequency scaling on the processing unit. Regarding power gating or clock gating, the control instructions instruct to turn off a portion of the circuit that is not currently operating, or alternatively, instruct to adjust the flip frequency of the registers in the processing unit. Regarding clock frequency setting, the control instructions instruct the control circuit to adjust the clock frequency. Regarding adjustment of the order of the multiple tasks to be performed, the control instructions instruct the control circuit adjust the order of the plurality of tasks to be performed. It should be understood that the above control circuitry may be implemented by software configuration or by hardware configuration, and this is not limited by embodiments of the present disclosure.

Figure 4:
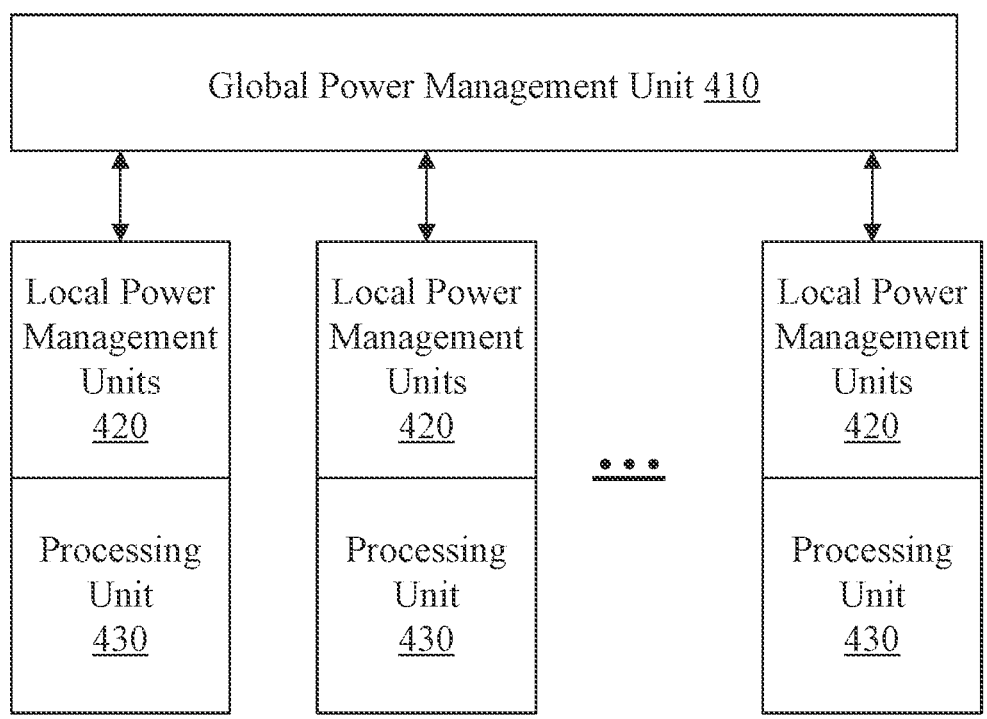
FIG. 4 is a schematic structural diagram of an example multi-processing unit system, according to some embodiments of the present disclosure.

FIG. 4 is a schematic structural diagram of an example multi-processing unit system according to some embodiments of the present disclosure. The multi-processing unit system may be a distributed processing system, and the processing unit may be a processing unit in the distributed processing system. For another example, the multi-processing unit system may be a multi-core processing unit. Specifically, the multi-processing unit system comprises, but not limited to, a system including a plurality of CPUs or GPUs, a heterogeneous system consisting of at least one CPU and at least one GPU, or a system consisting of at least one CPU or at least one GPU and other processing units. The multi-processing unit system of FIG. 4 includes a plurality of processing units 430, a plurality of local power management units 420 and a global power management unit 410. Each of the local power management units 420 corresponds to a processing unit 430.

In addition, the global power management unit 410 is configured to obtain a global power budget of the multi-processing unit system and allocate a local power budget for each processing unit 430 based on the global power budget and the power management parameters reported by each processing unit 430.

In addition, the local power management unit 420 is configured to manage, based on the allocated local power budget, the local power resources of the corresponding processing unit 430 to perform a task, and report the power management parameters while performing the task, to the global power management unit 410.

In general, the local power management unit 420 and the processing unit 430 are provided in plural. For example, FIG. 4 illustrates processing units 1-K and local power management units 1-K. Each local power management unit 420 and each processing unit 430 may have one-to-one correspondence. Among them, the global power management unit 410 and the local power management unit 420 may be formed as a power management module for managing the power consumption of the plurality of processing units 430 as well as the power management module itself.

In some embodiments of the present disclosure, the allocation of the local power budget for each processing unit takes into consideration the power management parameters of each processing unit, rather than direct equal allocation among all processing units, such that the local power consumption budget more accurately reflects the actual demand of each processing unit, thereby improving the overall power consumption efficiency. In addition, the allocation of the local power budget for each processing unit are performed in further consideration of the constraints of the global power budget, to avoid the phenomenon that the power consumption efficiency of each processing unit is optimized, but the overall power consumption efficiency is low, thereby improving the overall power consumption efficiency of the multi-processing unit system.

Figure 5:
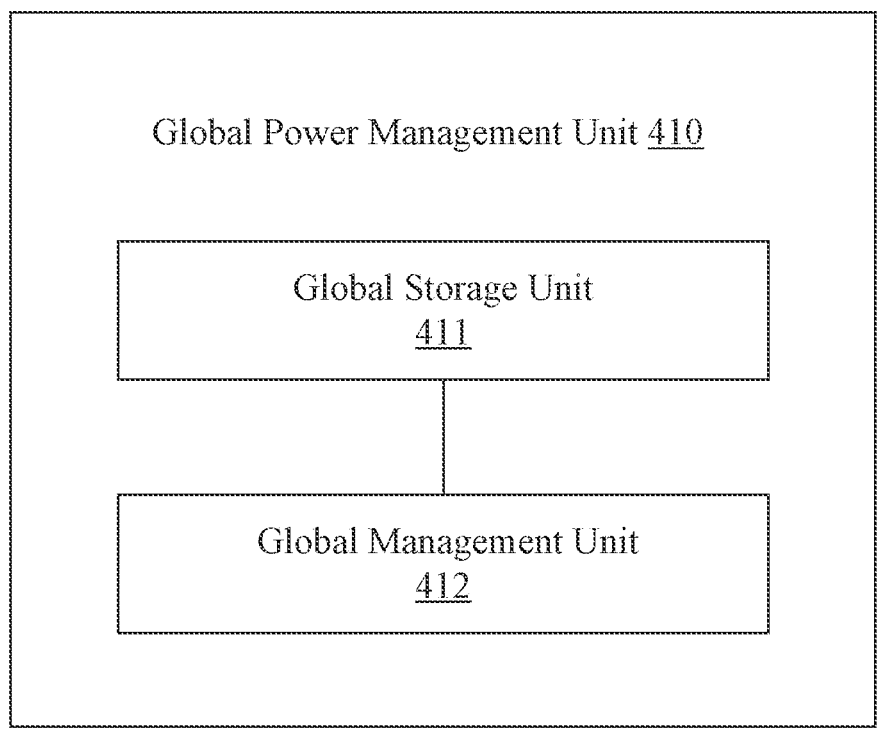
FIG. 5 is a schematic structural diagram of a global power management unit of the example multi-processing unit system of FIG. 4, according to some embodiments of the present disclosure.

FIG. 5 is a schematic structural diagram of the global power management unit according to the example multi-processing unit system of FIG. 4. The global power management unit 410 of FIG. 5 includes a global storage unit 411 and a global management unit 412.

The global storage unit 411 is configured to store the global power budget and the power management parameters of each processing unit. The global management unit 412 is configured to allocate the local power budget of each of the processing units based on the global power budget and the power management parameters of each of the processing units.

Figure 6:
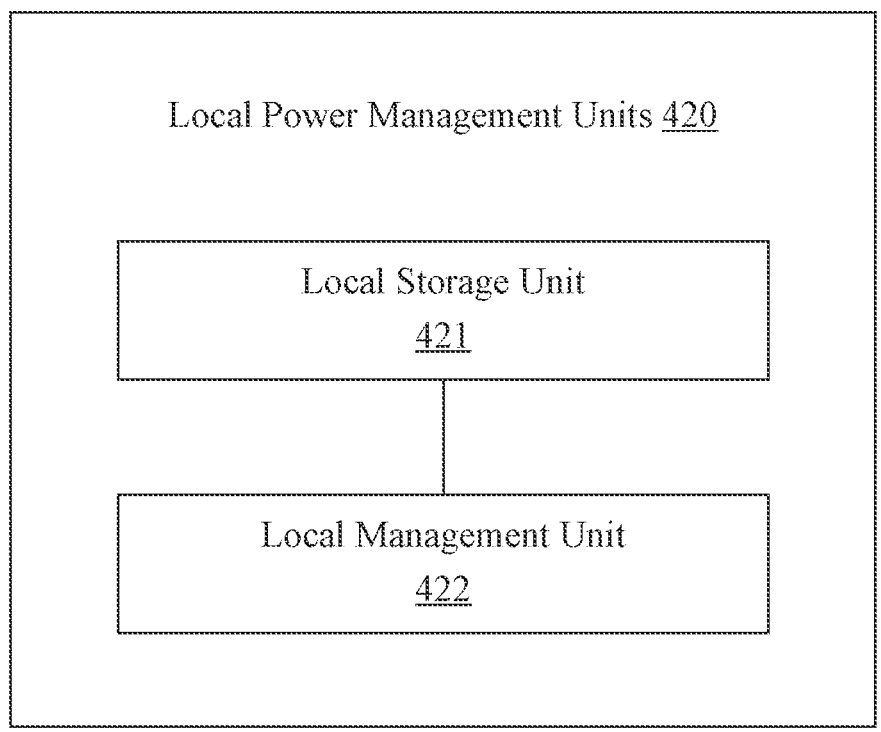
FIG. 6 is a schematic structural diagram of a local power management unit of the example multi-processing unit system of FIG. 4, according to some embodiments of the present disclosure.

FIG. 6 is a schematic structural diagram of the local power management unit according to the example multi-processing unit system of FIG. 4. The local power management unit 420 of FIG. 6 includes a local storage unit 421 and a local management unit 422.

The local storage unit 421 is configured to store local power budgets and power management parameters of corresponding processing units. The local management unit 422 is configured to determine a local power resource management strategy based on the local power budget and power management parameters of the processing unit.

It should be understood that the various units of this embodiment and operations thereof may be described and illustrated with reference to the above-described embodiments, wherein the processing units may perform similar or identical operations and functions as the processing units, which will not be repeated here.

The power management module of the multi-processing unit system will be described below again in combination with FIG. 4. The power management module includes a plurality of local power management units 420 and a global power management unit 410. Each local power management unit 420 corresponds to a processing unit 430. The global power management unit 410 is configured to obtain the global power budget of the multi-processing unit system and allocate the local power budget for each processing unit 430 according to the global power budget and the power management parameters reported by each processing unit 430. In addition, the local power management unit 420 is configured to manage, based on the allocated local power budget, the local power resources of the corresponding processing unit 430 to perform a task, and report the power management parameters while performing the task, to the global power management unit 410.

In some embodiments of the present disclosure, the allocation of the local power budget for each processing unit takes into consideration the power management parameters of each processing unit, rather than direct equal allocation among all processing units, such that the local power consumption budget more accurately reflects the actual demand of each processing unit, thereby improving the overall power consumption efficiency. In addition, the allocation of the local power budget for each processing unit are performed in further consideration of the constraints of the global power budget, to avoid the phenomenon that the power consumption efficiency of each processing unit is optimized, but the overall power consumption efficiency is low, thereby improving the overall power consumption efficiency of the multi-processing unit system.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It should be understood that the various units of this embodiment and their operations may be described and illustrated with reference to the respective embodiments described above, wherein the processing unit can perform similar or identical operations and functions as the processing unit, which will not be repeated herein.

It should be noted that, depending on the needs of implementation, the individual parts/steps described in the embodiments of the present disclosure may be divided into more parts/steps, or two or more parts/steps or partial operations of parts/steps may be combined into new parts/steps to achieve the purposes of the embodiments of the present disclosure.

The methods according to embodiments of the present disclosure described above may be implemented in hardware, firmware, or be implemented as software or computer code that may be stored in a recording medium (such as a CD ROM, RAM, floppy disk, hard disk, or magnetic disc), or be implemented as computer code that is originally stored in a remote recording medium or non-transitory machine-readable medium downloaded over a network and will be stored in a local recording medium. The methods described may be processed by such software stored on a recording medium using a general-purpose computer, a specialized processor, or programmable or specialized hardware (such as an ASIC or FPGA). It is understood that a computer, processor, microprocessor controller, or programmable hardware includes a storage component (e.g., RAM, ROM, flash memory, etc.) that can store or receive software or computer code that implements the methods described herein when the software or computer code is accessed and executed by the computer, processor, or hardware. Further, when a general-purpose computer accesses the code used to implement the methods illustrated herein, the execution of the code converts the general-purpose computer to a dedicated computer for performing the methods illustrated herein.

It is appreciated that the units and method steps of the examples described in conjunction with the embodiments disclosed herein are capable of being implemented with electronic hardware, or a combination of computer software and electronic hardware. Whether these functions are performed in hardware or software depends on the particular application and design constraints of the technical solution. It is appreciated that different methods to implement the described functions for each particular application may be used, but such implementations should not be considered outside the scope of the embodiments of the present disclosure.

The embodiments can further be described using the following clauses:

1. A power management method for a multi-processing unit system comprising a plurality of local power management units and a global power management unit, each local power management unit corresponding to a processing unit of the multi-processing unit system, the method comprising:
   obtaining, using the global power management unit, a global power budget for the multi-processing unit system;
   allocating, using the global power management unit, local power budget for each processing unit based on the global power budget and power management parameters of each processing unit;
   managing, using a local power management unit of the plurality of local power management units, local power resources of a corresponding processing unit based on an allocated local power budget for the corresponding processing unit;
   reporting, using the local power management unit, parameters of the corresponding processing unit to the global power management unit.

2. The method according to clause 1, wherein the power management parameters comprise at least one of energy consumption parameters, performance parameters, or workload parameters, and wherein the energy consumption parameters comprise at least one of power consumption values, power states, or local budget utilization rates.

3. The method according to any one of clauses 1 and 2, wherein obtaining the global power budget for the multi-processing unit system comprises:

determining the global power budget based on previous power management parameters of the processing units and the previous global power budget.

4. The method according to clause 3, wherein determining the global power budget based on the previous power management parameters of the processing units and the previous global power budget comprises:

determining the global power budget, using a first machine learning model or a first rule, based on the previous power management parameters of the processing units and the previous global power budget, such that a predicted power utilization rate of the global power budget is not lower than an actual power utilization rate of the previous global power budget.

5. The method according to clause 3, wherein determining the global power budget based on the previous power management parameters of each processing unit and the previous global power budget comprises:

determining the global power budget of the multi-processing unit system of a second power management period, based on the power management parameters of the processing units of a first power management period and the global power budget of the multi-processing unit system of the first power management period, wherein the second power management period follows the first power management period and the first power management period and the second power management period form a consecutive power management period.

6. The method according to clause 5, wherein allocating the local power budget for each of the processing units based on the global power budget and the power management parameters of each of the processing units comprises:

allocating the local power budget of each processing unit for the second power management period, based on the global power budget of the multi-processing unit system for the second power management period and the power management parameters of each processing unit of the first power management period.

7. The method according to any one of clause 1, wherein allocating the local power budget for each processing unit based on the global power budget and the power management parameters of each processing unit comprises:

determining an overall power budget for the processing units from the global power budget;

allocating a local power budget for each of the processing units, based on the overall power budget for the processing units and the power management parameters of each of the processing units.

8. The method according to clause 7, wherein allocating the local power budget for each of the processing units based on the overall power budget of the processing units and the power management parameters of each of the processing units comprises:

allocating, using a second rule, the local power budget for each of the processing units based on the overall power budget of the processing units and the power management parameters of each of the processing units, or, obtaining the local power budget for each of the processing units from a second machine learning model, based on using the overall power budget of the processing units and the power management parameters of each of the processing units as input to the second machine learning model, wherein obtaining the local power budget for each of the processing units from the second machine learning model, based on using the overall power budget of the processing units and the power management parameters of each of the processing units as input to the second machine learning model comprises:

determining, based on the previous power management parameters of each of the processing units, a current power budget reference parameter for each of the processing units;

inputting the current power budget reference parameter for each of the processing units and the current overall power budget for the processing units to the second machine learning model to obtain the local power budget for each of the processing units.

9. The method according to any one of clauses 1-8, wherein the multi-processing unit system further comprises shared resource shared by the processing units, wherein assigning a local power budget of each of the processing units based on the global power budget and power management parameters of each of the processing units comprises:

allocating a local power budget for each of the processing units based on the global power budget, power management parameters of each of the processing units, and power management parameters of the shared resource.

10. The method according to any one of clauses 1-9, wherein managing the local power resources of the corresponding processing units based on the allocated local power budget comprises:

determining and executing a local power resource management strategy based on the allocated local power budget and power management parameters of the local power management unit, wherein the local power resource management strategy comprises at least one of dynamic voltage frequency scaling, power gating, clock gating, clock frequency setting, or an adjustment of an order of tasks to be performed.

11. The method according to clause 5, wherein the global power management unit performs a first process in the condition that the power management parameters of each processing unit meet a predetermined condition during the first power management period.

12. The method according to clause 11, wherein the power management parameters comprise power consumption values, wherein the predetermined condition comprises: during the first power management period, a sum of the power consumption values of the processing units exceeding the global power budget of the first power management period.

13. The method according to clause 11, wherein the first process is one of the following:

reducing the power consumption value of each of the processing units during the first power management period, such that the sum of the power consumption values of the processing units during the first power management period does not exceed the global power budget for the first power management period, or determining difference amount between the sum of the power consumption values of the processing units during the power management period and the global power budget of the first power management period, and subtracting the difference amount from the global power budget of the second power management period.

14. The method according to any one of clauses 1-14, wherein the global power management unit is located within one of the processing units or outside the plurality of processing units.

15. A multi-processing unit system comprising:
a plurality of processing units;
a global power management unit configured to obtain a global power budget of the multi-processing unit system and to allocate a local power budget for each of the processing units based on the global power budget and power management parameters reported by each of the processing units;
a plurality of local power management units, each of local power management units corresponding to a processing unit of the plurality of processing units and configured to manage local power resources of corresponding processing units based on the allocated local power budget to perform tasks and to report the power management parameters consumed while performing the tasks to the global power management unit.

16. The multi-processing unit system according to clause 15, wherein the global power management unit comprises:
a global storage unit configured to store the global power budget and the power management parameters of the processing units;
a global management unit configured to allocate a local power budget for each of the processing units based on the global power budget and the power management parameters of each of the processing units.

17. The multi-processing unit system according to any of clauses 15 and 16, wherein the local power management unit comprises:
a local storage unit configured to store the local power budget and power management parameters of the corresponding processing unit; and
a local management unit configured to determine a local power resource management strategy based on the local power budget and power management parameters of the processing unit.

18. The multi-processing unit system according to any one of clauses 15-17, wherein the multi-processing unit system is a distributed processing system, and the processing unit is a processing unit in the distributed processing system.

19. The multi-processing unit system according to any one of clauses 15-18, wherein the multi-processing unit system is a multi-core processing unit, and the processing unit is a core in the multi-core processing unit.

20. A power management module for a multi-processing unit system comprising:
a plurality of local power management units, each of local power management unit corresponding to a processing unit in the multi-processing unit system respectively, the local power management unit being configured to manage the local power resources of the corresponding processing unit according to the allocated local power budget for performing tasks and to report to the global power management unit the power management parameters while performing the tasks.

The above examples are only for illustrating the embodiments of the present disclosure and are not a limitation of the embodiments of the present disclosure. A person of ordinary skill in the art shall make various variations and variants without departing from the spirit and scope of the embodiments of the present disclosure, so that all equivalent technical solutions also fall within the scope of the embodiments of the present disclosure, and the scope of patent protection of the embodiments of the present disclosure shall be limited by the claims.

In a typical configuration, the computing device includes one or more processors (CPUs), an input/output interface, a network interface, and a memory. The memory can include a volatile memory, a random access memory (RAM), and/or a non-volatile memory in computer-readable media, e.g., a read-only memory (ROM) or a flash RAM. The memory is an example of the computer-readable medium.

What is claimed is:

1. A power management method for a multi-processing unit system comprising a plurality of local power management units and a global power management unit, each local power management unit corresponding to a processing unit of the multi-processing unit system, the method comprising:
obtaining, using the global power management unit, a global power budget for the multi-processing unit system, comprising determining the global power budget based on previous power management parameters of the processing units and a previous global power budget, including:
determining the global power budget of the multi-processing unit system of a second power management period, based on the power management parameters of the processing units of a first power management period and the global power budget of the multi-processing unit system of the first power management period,
wherein the second power management period follows the first power management period, and the first power management period and the second power management period form a consecutive power management period;
allocating, using the global power management unit, local power budget for each processing unit based on the global power budget and power management parameters of each processing unit, comprising allocating the local power budget of each processing unit for the second power management period, based on the global power budget of the multi-processing unit system for the second power management period and the power management parameters of each processing unit of the first power management period;
managing, using a local power management unit of the plurality of local power management units, local power resources of a corresponding processing unit based on an allocated local power budget for the corresponding processing unit; and
reporting, using the local power management unit, parameters of the corresponding processing unit to the global power management unit.

2. The method according to claim 1, wherein the power management parameters comprise at least one of energy consumption parameters, performance parameters, or workload parameters, and
wherein the energy consumption parameters comprise at least one of power consumption values, power states, or local budget utilization rates.

3. The method according to claim 1, wherein determining the global power budget based on the previous power management parameters of the processing units and the previous global power budget comprises:
determining the global power budget, using a machine learning model or a rule, based on the previous power management parameters of the processing units and the previous global power budget, such that a predicted power utilization rate of the global power budget is not lower than an actual power utilization rate of the previous global power budget.

4. The method according to claim 1, wherein allocating the local power budget for each processing unit based on the global power budget and the power management parameters of each processing unit comprises:
   determining an overall power budget for the processing units from the global power budget.

5. The method according to claim 4, wherein allocating the local power budget for each of the processing units based on the overall power budget of the processing units and the power management parameters of each of the processing units comprises:
   allocating, using a rule, the local power budget for each of the processing units based on the overall power budget of the processing units and the power management parameters of each of the processing units, or,
   obtaining the local power budget for each of the processing units from a machine learning model, based on using the overall power budget of the processing units and the power management parameters of each of the processing units as input to the machine learning model,
   wherein obtaining the local power budget for each of the processing units from the machine learning model, based on using the overall power budget of the processing units and the power management parameters of each of the processing units as input to the machine learning model comprises:
      determining, based on the previous power management parameters of each of the processing units, a current power budget reference parameter for each of the processing units;
      inputting the current power budget reference parameter for each of the processing units and the current overall power budget for the processing units to the machine learning model to obtain the local power budget for each of the processing units.

6. The method according to claim 1, wherein the multi-processing unit system further comprises shared resource shared by the processing units,
   wherein assigning a local power budget of each of the processing units based on the global power budget and power management parameters of each of the processing units comprises:
      allocating a local power budget for each of the processing units based on the global power budget, power management parameters of each of the processing units and power management parameters of the shared resource.

7. The method according to claim 1, wherein managing the local power resources of the corresponding processing units based on the allocated local power budget comprises:
   determining and executing a local power resource management strategy based on the allocated local power budget and power management parameters of the local power management unit,
   wherein the local power resource management strategy comprises at least one of dynamic voltage frequency scaling, power gating, clock gating, clock frequency setting, or an adjustment of an order of tasks to be performed.

8. The method according to claim 1, wherein the global power management unit performs a first process in the condition that the power management parameters of each processing unit meet a predetermined condition during the first power management period.

9. The method according to claim 8, wherein the power management parameters comprise power consumption values, wherein the predetermined condition comprises: during the first power management period, a sum of the power consumption values of the processing units exceeding the global power budget of the first power management period.

10. The method according to claim 8, wherein the first process is one of the following: reducing the power consumption value of each of the processing units during the first power management period, such that the sum of the power consumption values of the processing units during the first power management period does not exceed the global power budget for the first power management period, or
   determining difference amount between the sum of the power consumption values of the processing units during the power management period and the global power budget of the first power management period, and subtracting the difference amount from the global power budget of the second power management period.

11. The method according to claim 1, wherein the global power management unit is located within one of the processing units or outside the plurality of processing units.

12. A multi-processing unit system comprising:
   a plurality of processing units;
   a global power management unit configured to:
      obtain a global power budget of the multi-processing unit system, comprising determining the global power budget based on previous power management parameters of the processing units and a previous global power budget, including:
         determining the global power budget of the multi-processing unit system of a second power management period, based on the power management parameters of the processing units of a first power management period and the global power budget of the multi-processing unit system of the first power management period,
         wherein the second power management period follows the first power management period, and the first power management period and the second power management period form a consecutive power management period; and
      allocate a local power budget for each of the processing units based on the global power budget and power management parameters reported by each of the processing units, comprising allocating the local power budget of each processing unit for the second power management period, based on the global power budget of the multi-processing unit system for the second power management period and the power management parameters of each processing unit of the first power management period;
   a plurality of local power management units, each of the local power management units corresponding to a processing unit of the plurality of processing units, and configured to:
      manage local power resources of corresponding processing units based on the allocated local power budget to perform tasks; and
      report the power management parameters consumed while performing the tasks to the global power management unit.

13. The multi-processing unit system according to claim 12, wherein the global power management unit comprises:
   a global storage unit configured to store the global power budget and the power management parameters of the processing units;
   a global management unit configured to allocate a local power budget for each of the processing units based on the global power budget and the power management parameters of each of the processing units.

14. The multi-processing unit system according to claim 12, wherein the local power management unit comprises:
a local storage unit configured to store the local power budget and power management parameters of the corresponding processing unit; and
a local management unit configured to determine a local power resource management strategy based on the local power budget and power management parameters of the processing unit.

15. The multi-processing unit system according to claim 12, wherein the multi-processing unit system is a distributed processing system, and the processing unit is a processing unit in the distributed processing system.

16. The multi-processing unit system according to claim 12, wherein the multi-processing unit system is a multi-core processing unit and the processing unit is a core in the multi-core processing unit.

* * * * *